United States Patent [19]

Arai

[11] Patent Number: 4,806,927
[45] Date of Patent: Feb. 21, 1989

[54] COMMUNICATION CONTROL METHOD
[75] Inventor: Hiroshi Arai, Tokyo, Japan
[73] Assignee: Honeywell Inc., Minneapolis, Minn.
[21] Appl. No.: 10,928
[22] Filed: Feb. 4, 1987
[30] Foreign Application Priority Data
  Feb. 28, 1986 [JP] Japan .................................. 61-43794
[51] Int. Cl.⁴ .......................... H04Q 9/00; H03J 3/00
[52] U.S. Cl. ............................... 340/825.050; 370/86
[58] Field of Search ..................... 340/825.05, 825.5;
                              370/85, 86, 88, 94, 56

[56] References Cited
U.S. PATENT DOCUMENTS

| | | | |
|---|---|---|---|
| 4,539,679 | 9/1985 | Bux et al. | 340/825.5 |
| 4,663,758 | 5/1987 | Lambarelli et al. | 370/85 |
| 4,700,185 | 10/1987 | Balph et al. | 370/85 |
| 4,719,621 | 1/1988 | May | 370/94 |

Primary Examiner—Donald J. Yusko
Attorney, Agent, or Firm—A. A. Sapelli; D. J. Lenkszus; A. Medved

[57] ABSTRACT

In a control system, having at least one controller for communicating with at least one station within the control system whereby the controllers require control of a token for initiating the communications, and further wherein the stations cannot obtain control of the token, a method of communicating between the controllers and the station wherein an instruction with a response request is sent from a controller to a station. Index data is sent back from the station and indicates a store position of status information that corresponds to the above instruction. Desired status information is retrieved by the controller utilizing the above index data, so that an execution result of the instruction sent by the controller can be verified.

3 Claims, 3 Drawing Sheets

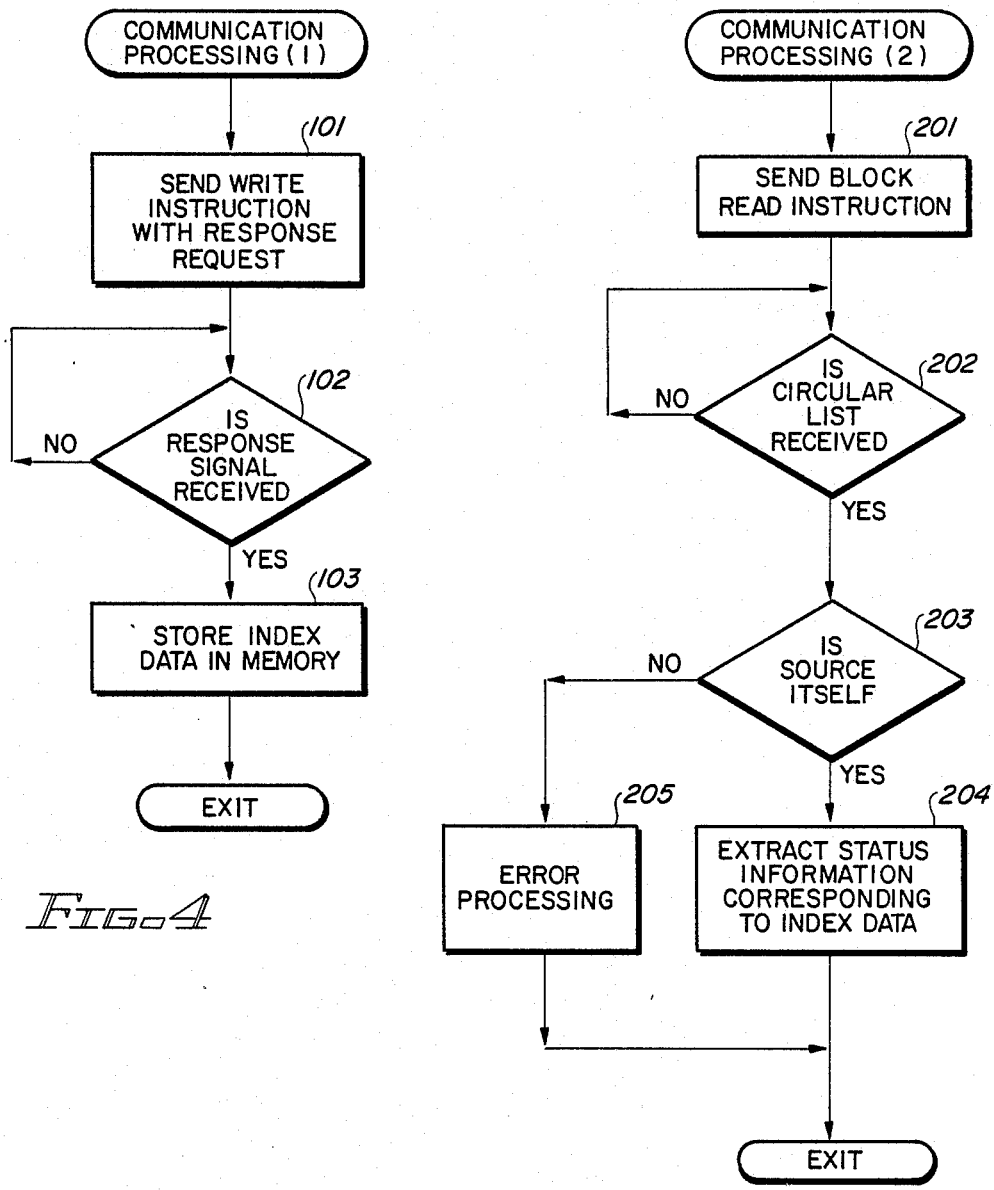

| DESTINATION ADDRESS | BYTE LENGTH | SOURCE ADDRESS | INSTRUCTION | INFORMATION 1 | CHECK CODE |

| DESTINATION ADDRESS | BYTE LENGTH | SOURCE ADDRESS | INSTRUCTION | INFORMATION 2 | CHECK CODE |

_4,806,927_

COMMUNICATION CONTROL METHOD

BACKGROUND OF THE INVENTION

The present invention relates to a communication control method in a process control system or the like and, more particularly, to a communication control method in a control system that includes a controller for communicating in a token passing system.

When a token passing system is used in a process control system, it may be structured such that an I/O station takes a token indirectly, i.e., takes instructions from a predetermined controller having control of the token, the I/O station performing an input/output (I/O) operation in response to the instruction. Since the I/O station does not take (control of) the token, the controller cannot verify that the instruction was accurately received and cannot verify the output operation performed by the I/O station in response to the instruction.

However, if the I/O station is to take the token, the I/O station takes the token each time an input/output operation is performed. In process control systems, it generally takes a long time for the I/O station to take the token and perform the software processing, resulting in a slow communication speed. In addition, in order to communicate by taking control of the token in such a manner, the I/O station requires both hardware and software implementations for communication, resulting in high cost.

According to the preferred embodiment of the present invention, a controller which has obtained the token, sends a write instruction with a response request to a station and holds index data sent back from the station which has received the above instruction and indicates a store position of status information corresponding to the above instruction. When the controller subsequently obtains the token, the controller retrieves and confirms corresponding status information on the station using the above index data, thereby permitting the controller to verify the I/O operation in response to the instruction without requiring the I/O station to obtain control of the token.

SUMMARY OF THE INVENTION

Accordingly, it is an object of the present invention to provide a method of communication between a controller and a station without requiring the station to obtain control of a token in a control system having at least one controller for communicating with at least one of the stations within the control system. The controller and the stations require control of the token for initiating the communications; however, the stations are structured such that they cannot obtain control of the token. The method of communicating between the controllers and the stations comprises steps wherein a controller which has obtained control of the token, sends an instruction to a predetermined station. The controller holds index data indicating a location where status information will be stored after the predetermined station executes the instruction. Finally, the controller retrieves the status information indication by the index data, thereby permitting the controller to verify the execution of the instruction without requiring the predetermined station to obtain control of the token.

Accordingly, it is an object of the present invention to provide a method of communicating between a controller and a station in a control system.

It another object of the present invention to provide a method of communicating between a controller and a station in a control system whereby the controllers require control of a token for initiating the communication.

It is still another object of the present invention to provide a method of communicating between a controller and a station in a control system whereby the controllers require control of a token for initiating the communication and further wherein a predetermined group of the station cannot obtain control of the token.

These and other objects of the present invention will become more apparent when taken in conjunction with the following description and attached drawings wherein like characters indicate like parts and which drawings form a part of the present application.

BRIEF DESCRIPTION OF THE DRAWINGS

FIG. 4 shows a flow diagram of the process utilized by the controller to send a write instruction;

FIG. 7 shows a flow diagram of the operation performed by the controller in order to verify that the instruction sent has been executed by the I/O station.

DETAILED DESCRIPTION

Figure 1:
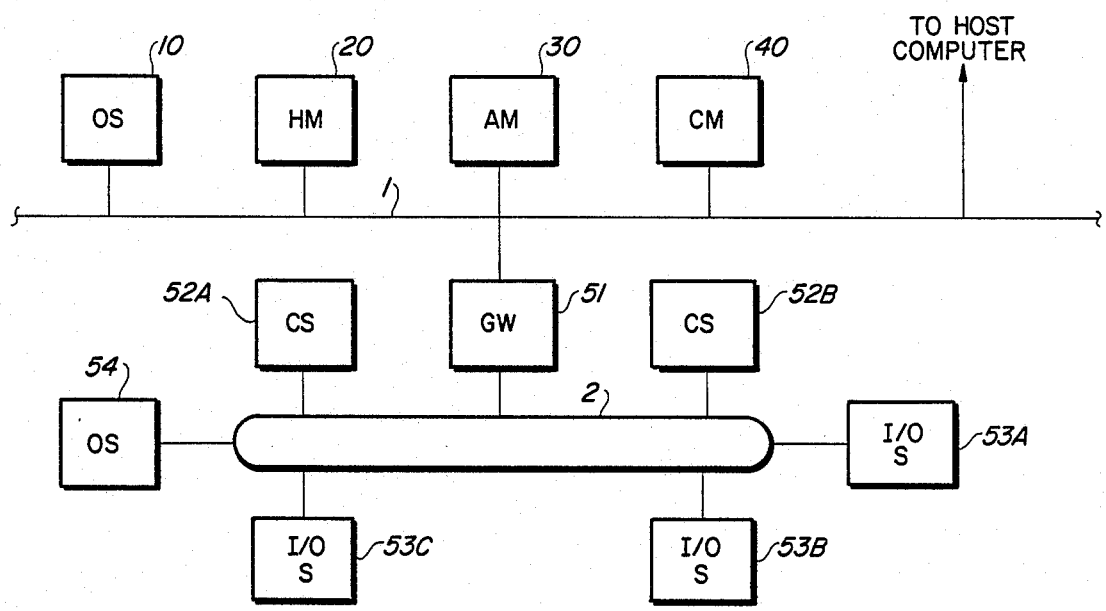
FIG. 1 shows a block diagram of a process control system according to the preferred embodiment of the present invention.

Referring to FIG. 1, there is depicted a block diagram showing an arrangement of a process control system according to the preferred embodiment of the present invention. A line 1 (i.e., a communication line) is connected to an operator station (OS) 10 constituting a man-machine interface, a history module (HM) 20 storing trade data, history data, and the like, an application module (AM) 30 storing an application program, and a computer module (CM) 40, the line 1 also being connected to a large host computer (not shown) for performing various information communications used on an as-needed basis.

A line 2, connected to the line 1 through a gate way (GW) 51 constituting a communication interface, is connected to controllers (CS) 52 (52a and 52b), I/O stations (I/O S) 53 53a 53c), and an operator station 54 to perform data communication. The line 2 of the preferred embodiment is a ring type line but may be different type lines, eg a bus type line.

Such lines 2 are arranged at proper positions in the process, and the process control is executed by control arithmetic in modules, stations, or the like, which are connected to the line 1 and the lines 2.

Figure 2:
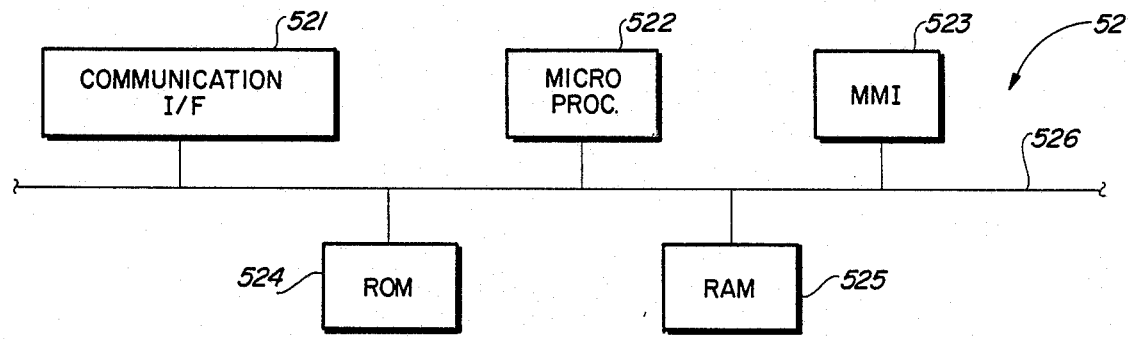
FIG. 2 shows a block diagram of the controllers of the process control system.

Referring to FIG. 2, there is shown a block diagram of the controller 52 arranged in such a way that a communication interface (I/F) 521 controls communication with the lines 2. Further, a microprocessor (u-P) 522, a man-machine interface (MMI) 523, a fixed memory (ROM) 524, and a variable memory (RAM) 525 are each connected to a common bus 526.

Figure 3:
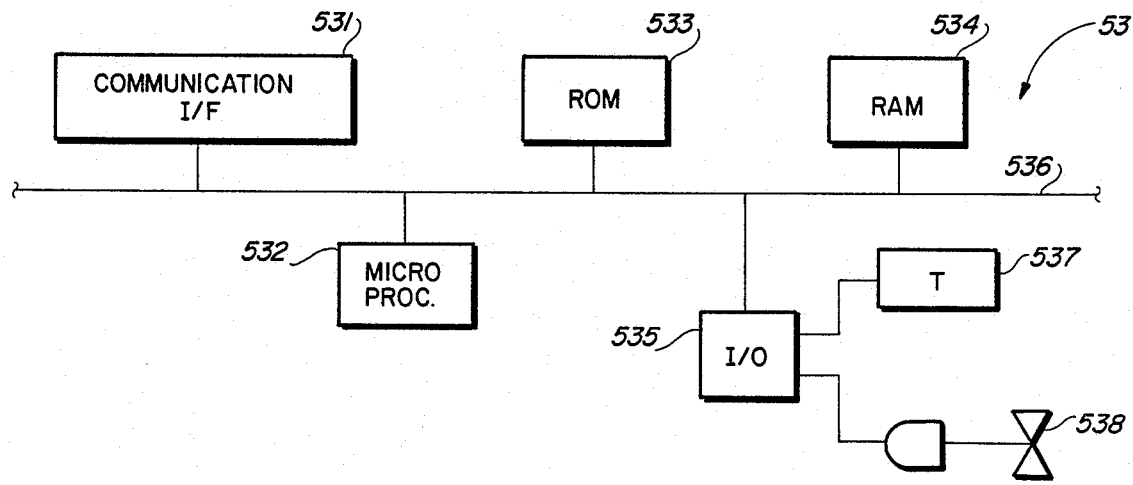
FIG. 3 shows a block diagram of the I/O stations of the process control system of FIG. 1.

Referring to FIG. 3 there is shown a block diagram of the I/O stations 53. The I/O stations 53 include a communication interface 531 which control the communication with the lines 2, a microprocessor 532, a fixed memory (ROM) 533, a variable memory (RAM) 534, and an input/output apparatus (I/O) 535 which are each connected to a common bus 536. The input/output apparatus 535 is connected to devices to be controlled, i.e., a detector (T) 537 for measuring various control amounts in the process and a device 538 to be operated, such as valves.

In the system described above, the controller 52 which has obtained a token sends a write instruction with a response request, as shown in FIG. 4 (step 101). This instruction includes a destination address, a byte length, a source address, an instruction-type, information 1 (i.e., data), and a check code, the format being shown in FIG. 5A. The information 1 includes a point address indicating which device is to be controlled, a parameter address indicating a parameter, a set value (Value), and other data.

Referring back to FIG. 4, after the controller 52 receives a response signal, including index data indicating a position on a circular list (to be described below) (step 102), the controller 52 stores the index data in a predetermined area of the variable memory 525 (step 103) and releases the token.

Figures 5A, 5B, 6:
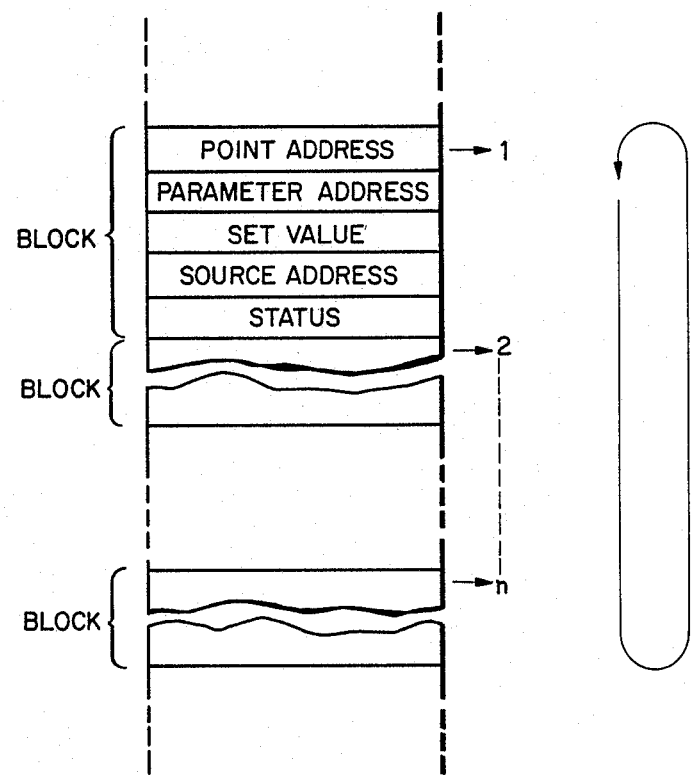
FIG. 5A shows the format of the write instruction.
FIG. 5B shows the format of the block read instruction initiated by the controller to request a reading of the circular list.
FIG. 6 shows a diagram of the structure of the circular list.

The circular list is a data list written in a software circular buffer provided in the variable memory 534 of the I/O station 53. Referring to FIG. 6, there is shown a diagram of the structure of the circular list. The circular list is made up of a plurality of data blocks which includes a point address, a parameter address, a set value, a source address, and a status indicating an actual value corresponding to the received write instruction.

Upon reception of the above instruction from the controller 52, the I/O station 53 writes the above-described various data relating to the instruction in the circular buffer and sends a response signal. This response signal includes a destination address, a byte length, a source address, a kind of the instruction, information 2, and the check code, the format being shown in FIG. 5B. The information 2 includes the above-mentioned index data, i.e., a content of a pointer indicating a store position of the block data in addition to a point address, a parameter address, and a set value. After the instruction is executed, corresponding status information is written in a predetermined area of the above block.

Thereafter, when a similar instruction is received from another controller 52 which has subsequently obtained the token, the I/O station 53 sequentially writes similar block data in the circular buffer. Each time the data is written, the content of the pointer is incremented by "1", and when the value reaches the maximum block number n of a prepared memory area, the content returns to 1.

Accordingly, it is desirable that when the controller 52 subsequently obtains the token, the controller 52 sends a block read instruction as shown in FIG. 7 (step 201). Referring to FIG. 7, since the I/O station 53 sends the entire circular list as described above, the controller 52, which has received the circular list (step 202), retrieves the desired block data by index data, which it has saved, confirms that a source address included in the block data coincides with this address step 03), and then extracts status information (step 204). In this manner, the controller 52 can verify that the instruction sent has been executed by the I/O station.

When the source address does not coincide with the self address (step 203), the controller 52 executes an error processing (step 205). This noncoincidence occurs when, after the controller 52 sends the instruction with a response request, the I/O station receives similar write instructions from another controller more than n times and the circular list is rewritten.

A description has been made with reference to the I/O station, but the present invention can be similarly applied to a system to which a station not capable of taking a token, is connected, and a control result can be fed back from this station.

Summarizing what has been described above, according to th present invention, an instruction with a response request is sent from a controller to a station. Index data is sent back from the station and indicates a store position of status information that corresponds to the above instruction. Desired status information is retrieved utilizing the above index data when a token is subsequently obtained by the controller, so that an execution result of the instruction sent by the controller to the station not capable of taking a token is confirmed.

While there has been shown what is considered the preferred embodiment of the present invention, it will be manifest that many changes and modifications can be made therein without departing from the essential spirit and scope of the invention. It is intended, therefor, in the annexed claims to cover all such changes and modifications which fall within the true scope of the invention.

I claim:

1. In a control system, having at least one controller for communicating with at least one station within the control system, the controllers and the stations being operatively connected to a ring utilizing a token ring passing system, whereby the controllers require control of a token for initiating the communications, and further wherein said stations cannot obtain control of said token, a method of communicating between said controllers and said stations, said method comprising the steps of:

(a) sending an instruction to a predetermined station by a controller which has obtained control of the token and which desires to communicate with the predetermined station, and further wherein the instruction is of a predetermined type which includes a response request;
    (b) receiving index data from the predetermined station, the index data indicating a store position of status information after the execution of th ®instruction by the predetermined station;
    (c) releasing control of said token; and
    (d) the controller, upon subsequently gaining control of the token, retrieving the status information from the predetermined station indicated by the index data of step (b), thereby permitting the controller to verify the execution of the instruction without requiring the predetermined station to obtain control of the token.

2. In a control system, having at least one controller for communicating with at least one station within the control system, the controllers and the stations being operatively connected to a ring utilizing a token-passing system, the token-passing system using a token whereby the controllers require control of the token for initiating the communications, and further wherein said stations are divided into a first group of stations which can obtain control of said token and a second group of stations which cannot obtain control of said token, a method of communicating between said controllers and said second group of stations, said method comprising the steps of:

(a) sending an instruction to a predetermined station of said second group of stations by a controller which has obtained control of the token and which desires to communicate with the predetermined station of said second group of stations, and further wherein the instruction is of a predetermined type which includes a response request;

(b) receiving index data from the predetermined station of said second group, the index data indicating a store position of status information after the execution of the instruction by the predetermined station of the second group;

(c) releasing control of said token; and (d) the controller, upon subsequently gaining control of the token, retrieving the status information from the predetermined station of the second group indicated by the index data of step (b), thereby permitting the controller to verify the execution of the instruction without requiring the predetermined station of the second group of obtain control of the token.

3. In a control system, having at least one controller for communicating with at least one station within the control system, the controllers and the station being operatively connected to a ring utilizing a token ring passing system, whereby the controllers require control of a token for initiating the communications, and further wherein said stations cannot obtain control of said token, a method of communicating between said controllers and said stations, said method comprising the steps of:

(a) sending an instruction to a predetermined station by a controller which has obtained control of the token and which desires to communicate with the predetermined station, and further wherein the instruction is of a predetermined type which includes a response request;

(b) the controller, awaiting a response from the predetermined station;

(c) transmitting a response message by the predetermined station to the controller, the response message including index data;

(d) receiving the response message, which includes the index data, from the predetermined station, the index data indicating a store position of status information after the execution of the instruction by the predetermined station;

(e) storing the response message received by the controller;

(f) releasing control of said token; and (g) the controller, upon subsequently gaining control of the token, retrieving the status information from the predetermined station indicated by the index data of the response message of step (d), thereby permitting the controller to verify the execution of the instruction without requiring the predetermined station to obtain control of the token.

* * * * *